(12) United States Patent
Saeki

(10) Patent No.: US 7,668,638 B2
(45) Date of Patent: Feb. 23, 2010

(54) INTER-VEHICLE DISTANCE CONTROL APPARATUS

(75) Inventor: Minoru Saeki, Seto (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 988 days.

(21) Appl. No.: 11/187,887

(22) Filed: Jul. 25, 2005

(65) Prior Publication Data

US 2006/0025918 A1 Feb. 2, 2006

(30) Foreign Application Priority Data

Jul. 30, 2004 (JP) .............................. 2004-224732

(51) Int. Cl.
    *B60T 7/12* (2006.01)
(52) U.S. Cl. ..................................... 701/96; 701/301
(58) Field of Classification Search .................. 701/96, 701/301
    See application file for complete search history.

(56) References Cited

U.S. PATENT DOCUMENTS

| | | | |
|---|---|---|---|
| 5,510,990 A | 4/1996 | Hibino et al. | |
| 6,430,494 B1* | 8/2002 | Inoue et al. | 701/96 |
| 6,434,471 B1* | 8/2002 | Asada et al. | 701/96 |
| 6,459,983 B1 | 10/2002 | Lichtenberg et al. | |
| 6,580,996 B1 | 6/2003 | Friedrich | |
| 2002/0095254 A1* | 7/2002 | Egawa et al. | 701/96 |
| 2002/0099491 A1* | 7/2002 | Akabori et al. | 701/96 |
| 2002/0152015 A1* | 10/2002 | Seto | 701/96 |
| 2002/0161506 A1* | 10/2002 | Ishizu et al. | 701/96 |
| 2003/0028311 A1* | 2/2003 | Seto et al. | 701/96 |
| 2003/0158648 A1* | 8/2003 | Kubota et al. | 701/96 |
| 2004/0102889 A1* | 5/2004 | Ibrahim | 701/96 |
| 2004/0119333 A1* | 6/2004 | Hackl | 303/125 |
| 2004/0140143 A1 | 7/2004 | Saeki et al. | |
| 2004/0193353 A1* | 9/2004 | Dunoyer et al. | 701/96 |
| 2005/0080565 A1* | 4/2005 | Olney et al. | 701/301 |
| 2006/0025918 A1* | 2/2006 | Saeki | 701/96 |

FOREIGN PATENT DOCUMENTS

| | | |
|---|---|---|
| DE | 198 59 284 A1 | 6/2000 |
| JP | A-10-006945 | 1/1998 |
| JP | A 2000-355232 | 12/2000 |
| JP | A 2002-067904 | 3/2002 |
| JP | A 2002-079846 | 3/2002 |
| JP | A-2003-112536 | 4/2003 |
| JP | A 2003-306053 | 10/2003 |

* cited by examiner

*Primary Examiner*—Khoi Tran
*Assistant Examiner*—Brian J Broadhead
(74) *Attorney, Agent, or Firm*—Oliff & Berridge, PLC

(57) ABSTRACT

A disclosed inter-vehicle distance control apparatus for controlling an inter-vehicle distance between a present vehicle equipped with this apparatus and a preceding vehicle traveling ahead of the present vehicle changes a target deceleration of the present vehicle and/or a deceleration gradient of the present vehicle, with which the deceleration reaches the target deceleration of the present vehicle, between when the present vehicle is under a first deceleration condition in which the present vehicle decelerates under the circumstance where the inter-vehicle distance between the present vehicle and the preceding vehicle is relatively short and when the present vehicle is under a second deceleration condition in which the present vehicle decelerates under the circumstance where the inter-vehicle distance is relatively long. The target deceleration and/or the deceleration gradient is increased when the present vehicle is under the first deceleration condition, compared to when the present vehicle is under the second deceleration condition.

9 Claims, 9 Drawing Sheets

INTER-VEHICLE DISTANCE CONTROL APPARATUS

BACKGROUND OF THE INVENTION

1. Field of the Invention

The present invention relates to the inter-vehicle distance control apparatus for controlling an inter-vehicle distance between a present vehicle equipped with this apparatus and a preceding vehicle by controlling operations of the present vehicle, and more particularly to an inter-vehicle distance control apparatus for preventing passengers in the present vehicle equipped with this apparatus from having a sense of discomfort about a deceleration occurring during the inter-vehicle distance control of the present vehicle.

2. Description of the Related Art

An inter-vehicle distance control apparatus for controlling the inter-vehicle distance between a present vehicle equipped with this apparatus and a preceding vehicle by controlling operations of the present vehicle is already known. Such an inter-vehicle distance control apparatus is typically configured to include: (a) a sensor for detecting a preceding vehicle; (b) a deceleration unit for decelerating the present vehicle; and (c) a controller for controlling the deceleration of the present vehicle by controlling the deceleration unit based on output signals from the sensor. See, for example, JP2002-79846A.

However, with such a conventional inter-vehicle distance control apparatus, passengers (especially, the driver) in the present vehicle equipped with such a conventional apparatus may have a sense of discomfort about a deceleration during the inter-vehicle distance control of the present vehicle in some circumstances.

For example, under the circumstance where the inter-vehicle distance is set relatively short under the inter-vehicle control, the passengers in the present vehicle equipped with such a conventional apparatus may have a sense of discomfort that the deceleration may be too gradual when the amount of undershoot becomes larger than necessary. On the other hand, under the circumstance where the inter-vehicle distance is set relatively long under the inter-vehicle control, the passengers in the present vehicle equipped with such a conventional apparatus may have a sense of discomfort that the deceleration may be too rapid when the amount of undershoot becomes smaller than necessary.

In addition, for example, under the circumstance where the inter-vehicle distance is relatively sufficient, the passengers in the present vehicle equipped with such a conventional apparatus may have a sense of discomfort that a deceleration gradient of the present vehicle may be larger than necessary when the deceleration is suddenly and rapidly increased to a target deceleration.

Furthermore, for example, under the circumstance where the inter-vehicle distance is relatively insufficient such as under a deceleration in following or under a deceleration in interruption, the passengers in the present vehicle equipped with such a conventional apparatus may have a sense of discomfort that the deceleration may be too gradual in light of such insufficiency of the inter-vehicle distance when the present vehicle decelerates with a small deceleration gradient as in the case where the inter-vehicle distance is relatively sufficient such as under a deceleration in catching-up.

SUMMARY OF THE INVENTION

To solve the above-mentioned problems, it is a main object of this invention to provide an inter-vehicle distance control apparatus for preventing the passengers in the present vehicle equipped with this apparatus from having a sense of discomfort about the deceleration during the inter-vehicle distance control of the present vehicle.

A first aspect of this invention to achieve the above object is an inter-vehicle distance control apparatus including a unit for controlling the inter-vehicle distance between a present vehicle equipped with this apparatus and a preceding vehicle traveling ahead of the present vehicle by controlling operations of the present vehicle, the unit being configured to change a target deceleration of the present vehicle between when the present vehicle is under a first deceleration condition in which the present vehicle decelerates under the circumstance where the inter-vehicle distance between the present vehicle and the preceding vehicle is relatively short and when the present vehicle is under a second deceleration condition in which the present vehicle decelerates under the circumstance where the inter-vehicle distance between the present vehicle and the preceding vehicle is relatively long.

In the context of this aspect, the first deceleration condition may arise when the present vehicle is under a deceleration in following or under a deceleration in interruption, and the second deceleration condition may arise when the present vehicle is under a deceleration in catching-up.

According to this aspect, since the target deceleration of the present vehicle equipped with the apparatus of this aspect is varied based on the inter-vehicle distance between the present vehicle and the preceding vehicle, the present vehicle is prevented from being decelerated with an unnecessarily too rapid or too gradual deceleration in light of the inter-vehicle distance between the present vehicle and the preceding vehicle, so that a proper inter-vehicle distance is maintained.

In this aspect, the unit is preferably configured to increase the target deceleration when the present vehicle is under the first deceleration condition, compared to when the present vehicle is under the second deceleration condition, to prevent the present vehicle from getting unnecessarily close to the preceding vehicle, under the circumstance where the inter-vehicle distance between the present vehicle and the preceding vehicle is relatively short in order to improve the driver's feeling of safety.

A second aspect of this invention to achieve the above object is an inter-vehicle distance control apparatus including a unit for controlling the inter-vehicle distance between a present vehicle equipped with this apparatus and a preceding vehicle traveling ahead of the present vehicle by controlling operations of the present vehicle, the unit being configured to change a deceleration gradient with which the deceleration of the present vehicle reaches a target deceleration between when the present vehicle is under a first deceleration condition in which the present vehicle decelerates under the circumstance where the inter-vehicle distance between the present vehicle and the preceding vehicle is relatively short and when the present vehicle is under a second deceleration condition in which the present vehicle decelerates under the circumstance where the inter-vehicle distance between the present vehicle and the preceding vehicle is relatively long.

In the context of this aspect, the first deceleration condition may arise when the present vehicle is under a deceleration in following or under a deceleration in interruption, and the second deceleration condition may arise when the present vehicle is under a deceleration in catching-up.

According to this aspect, since the deceleration gradient of the present vehicle equipped with the apparatus of this aspect is varied based on the inter-vehicle distance between the present vehicle and the preceding vehicle, the present vehicle is prevented from being decelerated with an unnecessarily too large or too small deceleration gradient in light of the inter-vehicle distance between the present vehicle and the preceding vehicle, so that the response of the deceleration is improved.

In this aspect, the unit is preferably configured to increase the deceleration gradient when the present vehicle is under the first deceleration condition, compared to when the present vehicle is under the second deceleration condition, to prevent the present vehicle from getting unnecessarily close to the preceding vehicle, under the circumstance where the inter-vehicle distance between the present vehicle and the preceding vehicle is relatively short, in order to improve the driver's feeling of safety.

A third aspect of this invention to achieve the above object is an inter-vehicle distance control apparatus including a unit for controlling the inter-vehicle distance between a present vehicle equipped with this apparatus and a preceding vehicle traveling ahead of the present vehicle by controlling operations of the present vehicle, the unit being configured to change a target deceleration of the present vehicle and a deceleration gradient with which the deceleration of the present vehicle reaches the target deceleration between when the present vehicle is under a first deceleration condition in which the present vehicle decelerates under the circumstance where the inter-vehicle distance between the present vehicle and the preceding vehicle is relatively short and when the present vehicle is under a second deceleration condition in which the present vehicle decelerates under the circumstance where the inter-vehicle distance between the present vehicle and the preceding vehicle is relatively long.

In the context of this aspect, the first deceleration condition may arise when the present vehicle is under a deceleration in following or under a deceleration in interruption, and the second deceleration condition may arise when the present vehicle is under a deceleration in catching-up.

According to this aspect, since the target deceleration and the deceleration gradient of the present vehicle equipped with the apparatus of this aspect is varied based on the inter-vehicle distance between the present vehicle and the preceding vehicle, the present vehicle is prevented from being decelerated with an unnecessarily too rapid or too gradual deceleration in light of the inter-vehicle distance between the present vehicle and the preceding vehicle, so that a proper inter-vehicle distance is maintained, as well as from being decelerated with an unnecessarily too large or too small deceleration gradient in light of the inter-vehicle distance between the present vehicle and the preceding vehicle, so that the response of the deceleration is improved.

In this aspect, the unit is preferably configured to increase the deceleration gradient when the present vehicle is under the first deceleration condition, compared to when the present vehicle is under the second deceleration condition, to prevent the present vehicle from getting unnecessarily close to the preceding vehicle under the circumstance where the inter-vehicle distance between the present vehicle and the preceding vehicle is relatively short in order to improve the driver's feeling of safety.

A fourth aspect of this invention to achieve the above object is an inter-vehicle distance control apparatus including a unit for controlling the inter-vehicle distance between a present vehicle equipped with this apparatus and a preceding vehicle traveling ahead of the present vehicle by controlling operations of the present vehicle, the unit being configured to change a target deceleration of the present vehicle and a deceleration gradient with which the deceleration of the present vehicle reaches the target deceleration among (1) when the present vehicle is under a first deceleration condition in which the present vehicle decelerates based on operations of the preceding vehicle under the circumstance where the inter-vehicle distance between the present vehicle and the preceding vehicle is relatively short, (2) when the present vehicle is under a second deceleration condition in which the present vehicle decelerates based on operations of a third vehicle under the circumstance where the inter-vehicle distance between the present vehicle and the preceding vehicle is relatively short, and (3) when the present vehicle is under a third deceleration condition in which the present vehicle decelerates under the circumstance where the inter-vehicle distance between the present vehicle and the preceding vehicle is relatively long.

In the context of this aspect, the first deceleration condition may arise when the present vehicle is under a deceleration in following, the second deceleration condition may arise when the present vehicle is under a deceleration in interruption, and the third deceleration condition may arise when the present vehicle is under a deceleration in catching-up.

According to this aspect, since the target deceleration and the deceleration gradient of the present vehicle equipped with the apparatus of this aspect is varied based on the inter-vehicle distance between the present vehicle and the preceding vehicle, the present vehicle is prevented from being decelerated with an unnecessarily too rapid or too gradual deceleration in light of the inter-vehicle distance between the present vehicle and the preceding vehicle, so that a proper inter-vehicle distance is maintained, as well as from being decelerated with an unnecessarily too large or too small deceleration gradient in light of the inter-vehicle distance between the present vehicle and the preceding vehicle, so that the response of the deceleration is improved.

Furthermore, according to this aspect, since the deceleration of the present vehicle due to the deceleration of the preceding vehicle and the deceleration of the present vehicle due to the interruption of the third vehicle or the present vehicle are distinguished, a relationship between maintaining the proper inter-vehicle distance between the present vehicle and the preceding vehicle and improving the response of the deceleration is appropriately well-balanced.

BRIEF DESCRIPTION OF THE DRAWINGS

These and other objects, features, and advantages of the present invention will become more apparent upon reading the following detailed description with reference to the accompanying drawings, in which.

DETAILED DESCRIPTION OF THE PREFERRED EMBODIMENTS

A preferred embodiment of the present invention is now described with reference to the appended drawings. Note that the basic structure and functions of the inter-vehicle distance control apparatus are not described in detail in the following description because such matters are known to the person skilled in the art.

Figure 1:
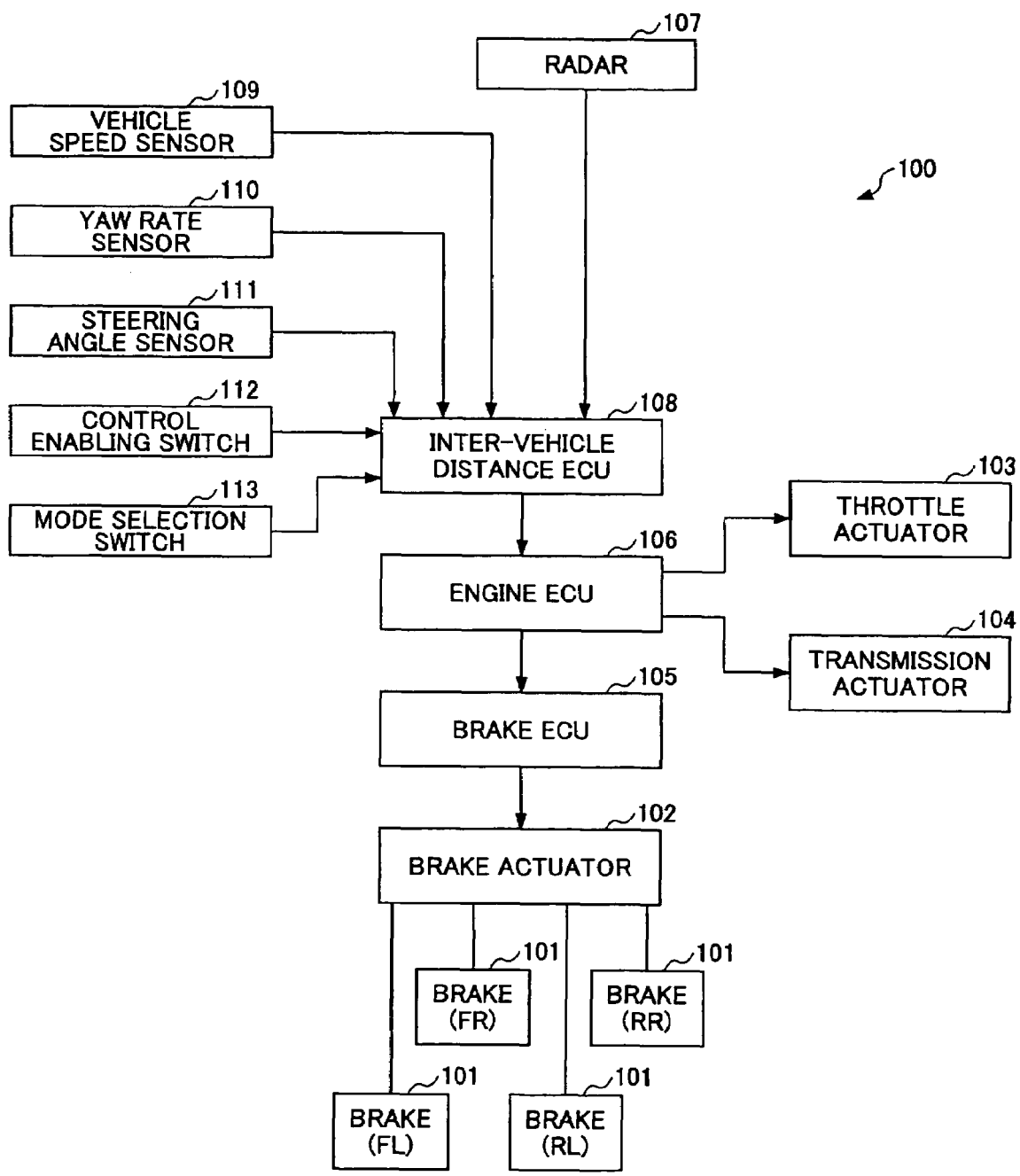
FIG. 1 is a schematic block view showing a hardware structure of an inter-vehicle distance control apparatus according to an embodiment of this invention.

FIG. 1 schematically shows a hardware structure of an inter-vehicle distance control apparatus 100 according to this embodiment. The inter-vehicle distance control apparatus 100 is for use aboard a vehicle. The vehicle is driven by driving forces delivered from a source of power such as an engine (or a motor) via a (geared or gearless) transmission to a plurality of driven wheels.

The vehicle includes brakes 101, each of which brakes one of a plurality of wheels including the driven wheels. The brake 101 may be, for example, a frictional brake or a regenerative brake. The plurality of wheels includes right and left front wheels and right and left rear wheels. In FIG. 1, "FL" indicates the front left wheel; "FR" indicates the front right wheel; "RL" indicates the rear left wheel; and "RR" indicates rear right wheel. The vehicle includes a brake actuator 102, which may be motor-driven or electromagnetic-pressure controlled, for electrically controlling the brake 101 of each wheel.

The engine includes a throttle inside of its intake manifold. The engine power varies in proportion to opening of the throttle. The opening of the throttle can be electrically controlled by a throttle actuator 103 (e.g. an electric motor).

In the transmission, a change gear ratio between an input shaft and an output shaft is varied. In order to electrically control the change gear ratio, a transmission actuator 104 (e.g. a solenoid) is provided.

Furthermore, the vehicle includes a brake ECU (Electronic Control Unit) 105 for controlling the brakes 101 by means of the brake actuator 102, as well as an engine ECU 106 for controlling the engine and the transmission by means of the throttle actuator 103 and the transmission actuator 104, respectively. The brake ECU 105 and the engine ECU 106 are mainly comprised of a computer including CPU, ROM, and RAM. This is also true of below-mentioned other ECUs.

As shown in FIG. 1, the inter-vehicle distance control apparatus of this embodiment includes a radar 107 as a sensor for detecting the preceding vehicle traveling ahead of the present vehicle. The radar 107 is a device for detecting the distance from the present vehicle to an object and the relative direction of the location of the object from the viewpoint of the present vehicle by emitting electromagnetic waves including light, sound, and the like and receiving some of the emitted electromagnetic waves, which are reflected back from the object in a detecting zone of the radar 107. The radar 107 covers the whole area of the detecting zone, which has a substantially sector shape, by, for example, reciprocatingly rotating a beam of the electromagnetic waves of the radar 107 through an arc centered on a traveling direction of the present vehicle within a predetermined range of angles in order to scan ahead.

Figure 2:
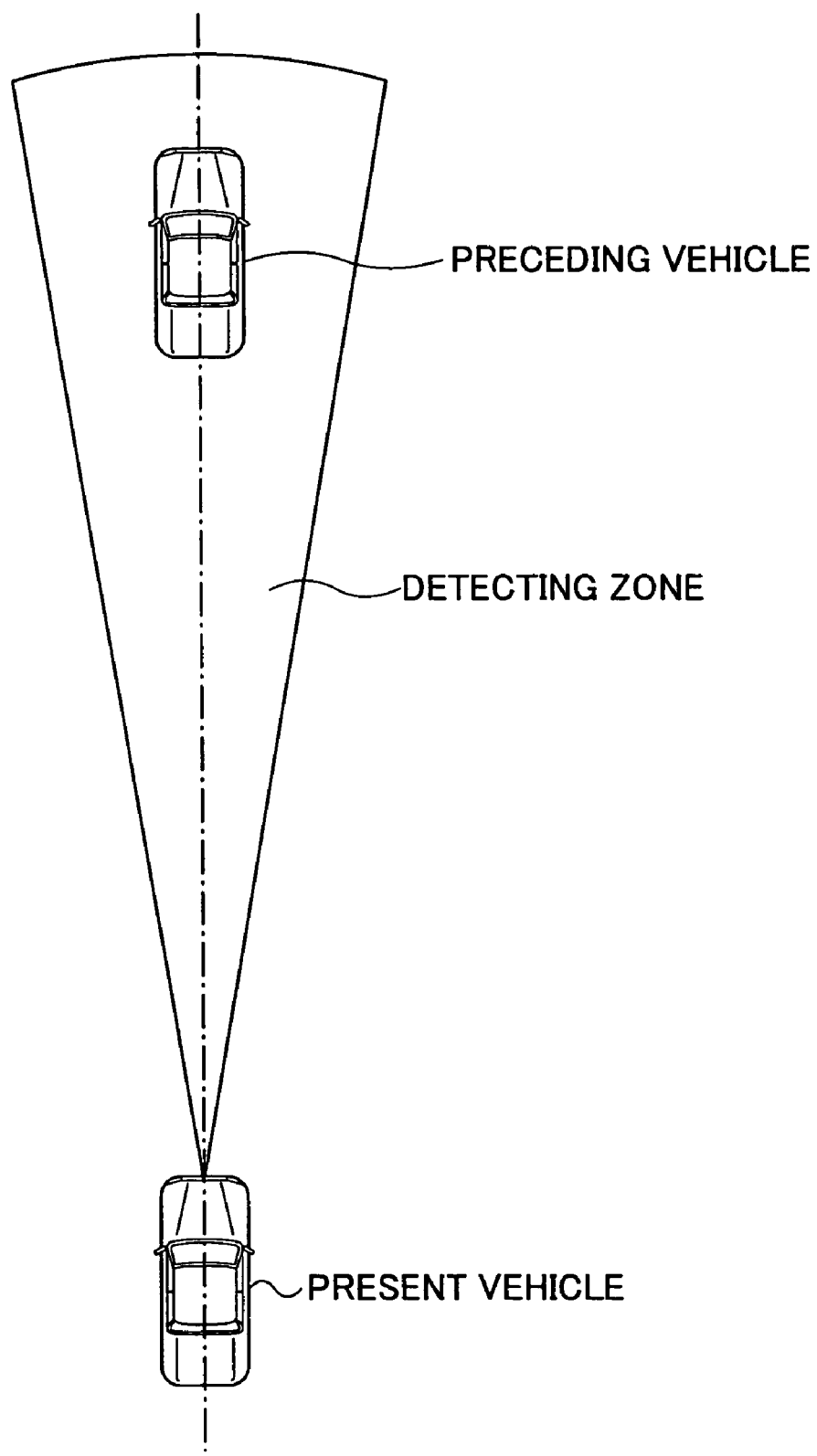
FIG. 2 is a view conceptually showing detection of a preceding vehicle by a radar in FIG. 1.

In a case where an object to be detected by the radar 107 is a preceding vehicle traveling ahead of the present vehicle equipped with the apparatus, the radar 107 detects an inter-vehicle distance, which is the distance from the present vehicle to the preceding vehicle, as well as a relative direction of the location of the preceding vehicle from the viewpoint of the present vehicle. In FIG. 2, an example is shown of the case where one preceding vehicle exists within the detecting zone of the radar 107 of the present vehicle.

The electromagnetic waves emitted from the radar 107 can be selected, for example, from laser lights (e.g. laser beams) and millimeter waves. By the way, a typical vehicle has a pair of reflectors set apart in right and left directions on the rear surface of the vehicle. The radar 107 can distinguish each vehicle from others even within its detecting zone by utilizing reflected waves from such a pair of reflectors of each vehicle.

As shown in FIG. 1, an inter-vehicle distance ECU 108 is provided in the inter-vehicle distance control apparatus 100, which controls operations of the present vehicle based on output signals of the radar 107 in order to make the inter-vehicle distance between the present vehicle and the preceding vehicle close to a target distance.

Essentially, the inter-vehicle distance ECU 108 controls the braking force via the brake ECU 105 and the brake actuator 102 for deceleration, and controls the throttle opening and the change gear ratio via the engine ECU 106, the throttle actuator 103, and the transmission actuator 104 for acceleration.

As shown in FIG. 1, the inter-vehicle distance control apparatus 100 of this embodiment also includes a vehicle speed sensor 109, a yaw rate sensor 110, and a steering angle sensor 111.

The vehicle speed sensor 109 is for detecting traveling speed of the present vehicle by actual measurement or estimation. The vehicle speed sensor 109 may, for example, estimate the traveling speed of the present vehicle based on output signals from a plurality of wheel rotation speed sensors for detecting the speed of rotation for each wheel.

The yaw rate sensor 110 is for detecting the yaw rate actually generated on the present vehicle. The yaw rate sensor 110 has a tuning fork type transducer, and detects the yaw rate of the present vehicle by detecting distortions generated on the transducer due to a yaw moment of the present vehicle.

The steering angle sensor 111 is for detecting an angle by which the steering wheel of the present vehicle is turned by the driver of the present vehicle as the steering angle.

As shown in FIG. 1, the inter-vehicle distance control apparatus 100 of this embodiment also includes a control enabling switch 112 and a mode selection switch 113.

The control enabling switch 112 is to be operated by the driver of the present vehicle in order to input the driver's intention concerning whether the inter-vehicle distance control is to be enabled into the inter-vehicle distance ECU 108.

The mode selection switch 113 is to be operated by the driver in order to select a desired control mode for the driver among the plurality of the control modes prepared in advance to control the inter-vehicle distance.

In this embodiment, these control modes are, by way of example, prepared in terms of an inter-vehicle time period. In this context, the inter-vehicle time period is an expected time period (interval) from a moment when the preceding vehicle passes through a certain location until a later moment when the present vehicle will pass through the same location. Furthermore, in this embodiment, these control modes are defined to include Long Time Period Control Mode, Intermediate Time Period Control Mode, and Short Time Period Control Mode. In this context, the Long Time Period Control Mode is for use in controlling the inter-vehicle distance such that a relatively long inter-vehicle distance between the present vehicle and the preceding vehicle is maintained in order to make the inter-vehicle time period relatively long. Also, in this context, the Short Time Period Control Mode is for use in controlling the inter-vehicle distance such that a relatively short inter-vehicle distance between the present vehicle and the preceding vehicle is maintained in order to make the inter-vehicle time period relatively short. Further, in this context, the Intermediate Time Period Control Mode is for use in controlling the inter-vehicle distance such that an intermediate inter-vehicle distance between the inter-vehicle distances maintained with the Long and Short Time Period Control Modes is maintained.

Software configurations used in the inter-vehicle distance control apparatus 100 of this embodiment are now explained.

Figure 3:
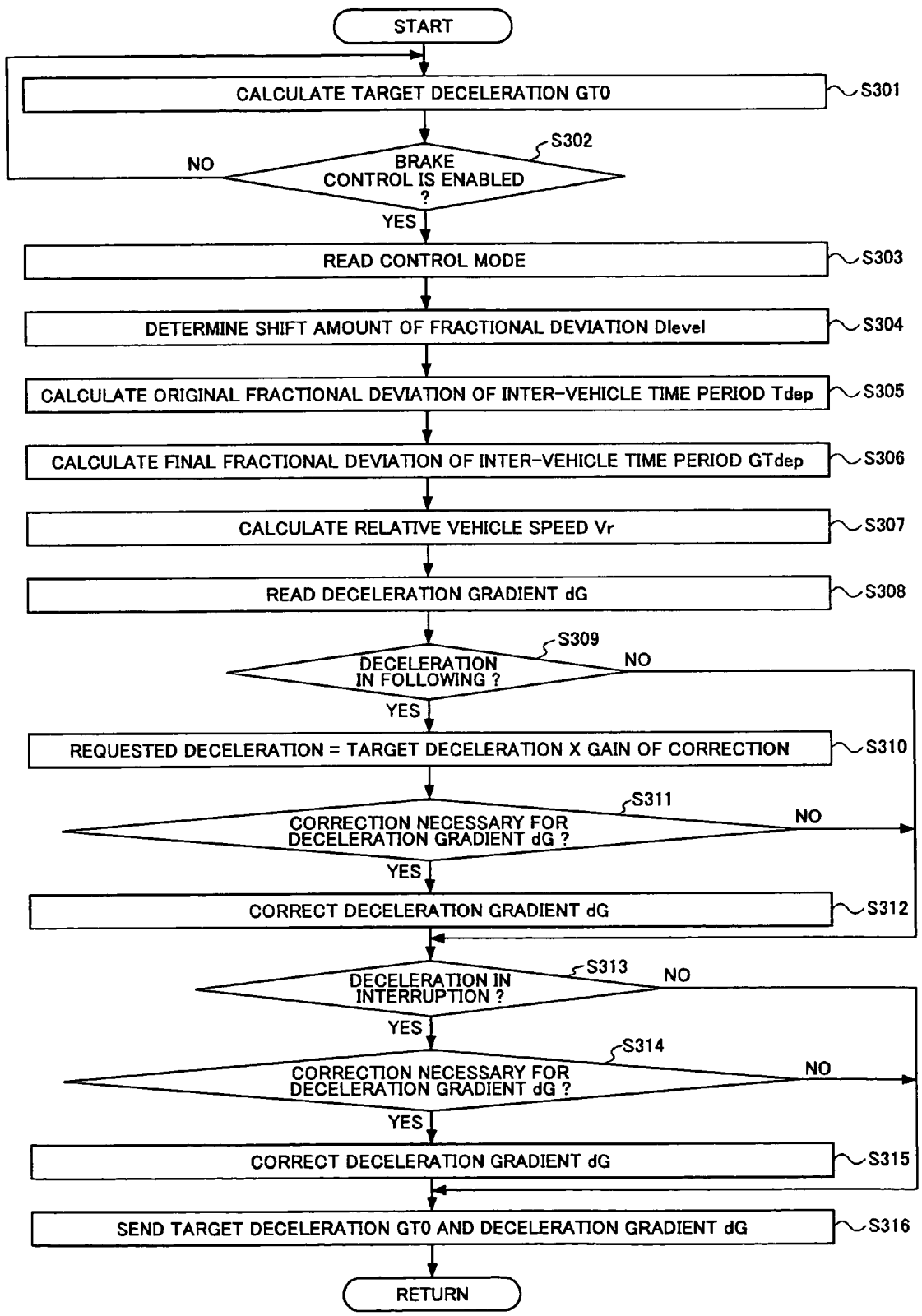
FIG. 3 is a flowchart for a process of a deceleration control program run by a computer in an inter-vehicle distance ECU in FIG. 1.

Pre-stored in the ROM of the computer in the inter-vehicle distance ECU 108 are various programs for performing the above inter-vehicle distance control. In FIG. 3, the content of a deceleration control program, which is one of such programs, is conceptually presented in a flowchart. Note that nonessential portions for the description of this embodiment are omitted in FIG. 3.

In this deceleration control program, a target deceleration GT0 for the present vehicle is first calculated based on inter-vehicle distance information between the present vehicle and the preceding vehicle (S301). A relationship between the inter-vehicle distance information and the target deceleration GT0 is pre-stored in a form such as a map or a table in the above ROM. Based on such relationship, the target deceleration GT0 corresponding to current inter-vehicle distance information is determined as a current target deceleration GT0.

In this context, the "inter-vehicle distance information" can be defined to include, for example, both of a relative speed Vr of the preceding vehicle to the present vehicle and the above inter-vehicle time period T.

The "relative velocity Vr" in this context reflects a situation where the present vehicle is separating from the preceding vehicle and the inter-vehicle distance is increasing when a sign of Vr is plus (+), while the relative velocity Vr reflects a situation where the present vehicle is closing on the preceding vehicle and the inter-vehicle distance is decreasing when the sign of Vr is minus (−).

In other words, the relative velocity Vr is an example of physical quantities indicating the direction of a relative movement of the present vehicle to the preceding vehicle as well as the degree of such relative movement. In this context, the direction of the relative movement means the direction in which the current relative position of the present vehicle to the preceding vehicle is displaced from a previous relative position of the present vehicle to the preceding vehicle, which is toward or away from the preceding vehicle, upon comparing the current relative position with the previous relative position.

On the other hand, regarding the "inter-vehicle time period T", upon comparing a case where the inter-vehicle time period T is relatively long with a case where the inter-vehicle time period T is relatively short under the same vehicle speed, a longer inter-vehicle time period T indicates a longer inter-vehicle distance. It is desirable for the inter-vehicle distance not to be constant, but variable depending on the vehicle speed, in order to make it proper. Consequently, when the inter-vehicle distance is used, it becomes necessary to make reference to the current vehicle speed in order to determine whether the current inter-vehicle distance is longer or shorter than a proper inter-vehicle distance. In contrast to this, the inter-vehicle time period T can indicate by itself how carefully the driver of the present vehicle should pay attention in order to avoid a collision between the preceding vehicle and the present vehicle. Accordingly, it can be said that the inter-vehicle time period T is a parameter that describes the driver's senses more faithfully.

In other words, the inter-vehicle time period T is an example of physical quantities indicating a direction of displacement of the relative position of the present vehicle to the preceding vehicle as well as a degree of such displacement of the relative position. In this context, the direction of displacement of the relative position means a direction in which an actual relative position of the present vehicle to the preceding vehicle is displaced from a target relative position of the present vehicle to the preceding vehicle, which is toward or away from the preceding vehicle, upon comparing the actual relative position with the target relative position.

Once the target deceleration GT0 is calculated in this way, it is then decided whether the brake control should be enabled in order to control the deceleration of the present vehicle (S302). In this decision, the brake control may be enabled, for example, (a) when the radar 107 captures a preceding vehicle (i.e., there is a preceding vehicle to be followed by the present vehicle), (b) when the probability that the preceding vehicle captured by the radar 107 is traveling in the same traffic lane with the present vehicle is greater than or equal to a predetermined value, and (c) when the inter-vehicle distance detected by the radar 107 is less than a predetermined threshold distance for enabling the brake control.

In a case where the target deceleration GT0 is so small that it may be achieved by, for example, closing the throttle (i.e., using engine braking), the brake control is not enabled ("NO" at S302).

On the other hand, in a case where the brake control is enabled ("YES" at S302), a deceleration gradient dG of the present vehicle, which is set as a target deceleration, is then determined at S303-S308. As mentioned previously, under the circumstance where the inter-vehicle distance between the present vehicle and the preceding vehicle is relatively sufficient, the passengers in the present vehicle may have a sense of discomfort that the deceleration may be more rapid than necessary when the target deceleration GT0 is suddenly and rapidly realized. Therefore, in this embodiment, the deceleration gradient dG until the deceleration reaches the target deceleration GT0 is decided at S303-S308, and when the inter-vehicle distance is relatively sufficient, an upper limit is put on the deceleration gradient dG so that the target deceleration GT0 is gradually realized.

Figure 4:
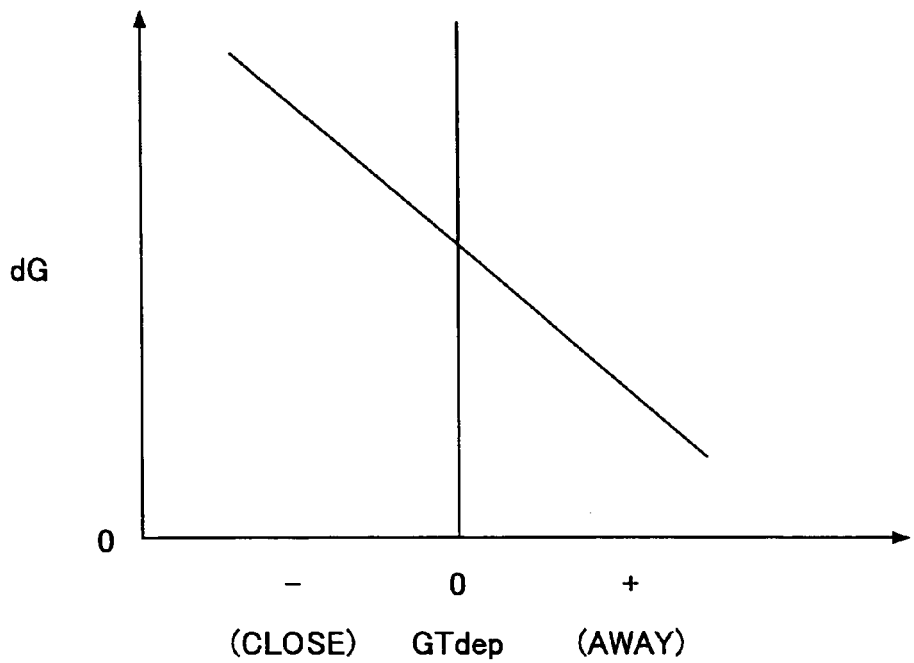
FIG. 4 is a graph showing an example of a relationship between a final fractional deviation GTdep and a deceleration gradient dG used by the deceleration control program in FIG. 3.

At first, processes at S303-S308 are outlined. The deceleration gradient dG is determined based on the relative vehicle speed Vr and a final fractional deviation of the inter-vehicle time period GTdep, using a relationship between GTdep and dG, an example of which is shown in FIG. 4. Such a relationship between GTdep and dG is pre-stored in the above-mentioned ROM.

Note that FIG. 4 shows an example of the relationship between the final fractional deviation of the inter-vehicle time period GTdep and the deceleration gradient dG in a downward-sloping graphic line under a particular relative vehicle speed Vr. As the relative vehicle speed Vr increases so that the inter-vehicle distance also increases, this graphic line is shifted on a coordinate plane of FIG. 4 in a direction in which the deceleration gradient dG decreases. On the other hand, as the relative vehicle speed Vr decreases so that the inter-vehicle distance also decreases, this graphic line is shifted on the coordinate plane of FIG. 4 in a direction in which the deceleration gradient dG increases.

In this context, the "final fractional deviation of the inter-vehicle time period GTdep" can be calculated by adding a shift amount of the fractional deviation Dlevel to an original fractional deviation of the inter-vehicle time period Tdep.

The original fractional deviation of the inter-vehicle time period Tdep is obtained by subtracting the target inter-vehicle time period TT from the actual inter-vehicle time period TR and then dividing the result by the target inter-vehicle time period TT (i.e., Tdep=(TR-TT)/TT). When Tdep=0, the original fractional deviation of the inter-vehicle time period Tdep implies that the target inter-vehicle distance is just being achieved. When Tdep<0, Tdep implies that the actual inter-vehicle distance is shorter than the target inter-vehicle distance, while when Tdep>0, Tdep implies that the actual inter-vehicle distance is longer than the target inter-vehicle distance.

Furthermore, in this context, the "actual inter-vehicle time period TR" is obtained by dividing the actual inter-vehicle distance D by the actual vehicle speed Vn of the present vehicle. On the other hand, the "target inter-vehicle time period TT" is determined based on the control mode selected by the driver of the present vehicle via the mode selection switch 113. As it turns out, it can be said that the original fractional deviation of the inter-vehicle time period Tdep represents a percentage (or proportion) of non-achievement of the actual inter-vehicle time period TR in comparison with the target inter-vehicle time period TT. By the way, functions of the shift amount of the fractional deviation Dlevel are discussed later.

Figure 5:
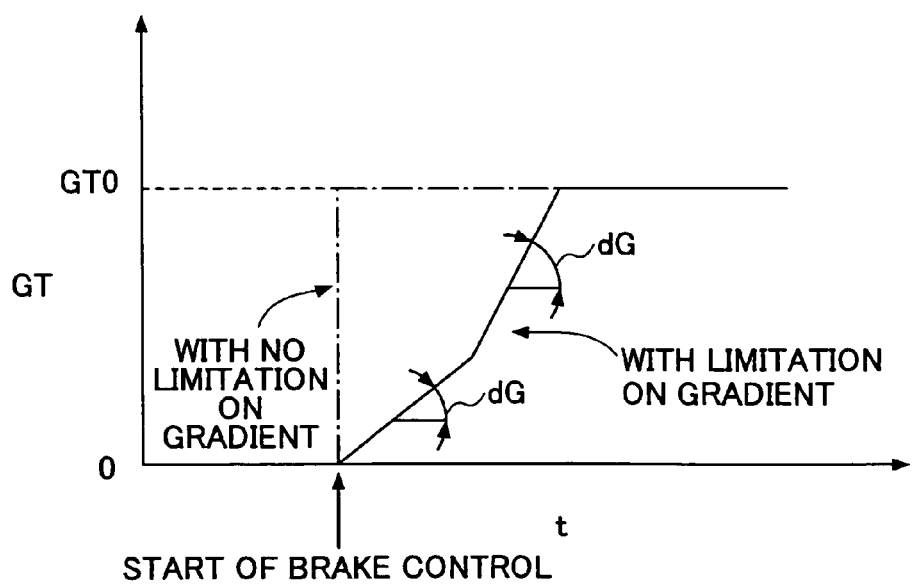
FIG. 5 is a graph showing an example of the transition of a target deceleration GT under a series of deceleration control operations run by the deceleration control program in FIG. 3.

FIG. 5 shows the respective meaning of the target deceleration GT0 and the deceleration gradient dG in a graph. The target deceleration GT0 is a target value for a steady-state value of the deceleration caused by the brake control, while the deceleration gradient dG is used to define a transient-state value of the target deceleration GT0, which is a target deceleration GT during a transient period in which an actual deceleration GR increases from 0 to the target deceleration GT0.

In FIG. 5, a time shift of the target deceleration GT in a case where the deceleration gradient dG is not limited, i.e., where the actual deceleration GR is allowed to increase immediately after the target deceleration GT0 is set, is shown in a chain line. In addition, in FIG. 5, a time shift of the target deceleration GT in a case where the deceleration gradient dG is limited in accordance with this embodiment, i.e., where the deceleration gradient dG is allowed to vary depending on the relative vehicle speed Vr and the fractional deviation of the inter-vehicle time period Tdep as stated above, is shown in a continuous line.

As seen from FIG. 5, according to this embodiment, the actual deceleration GR of the present vehicle can be made to gradually vary during the deceleration control of the present vehicle, in comparison with a case where the deceleration gradient dG is not limited.

The meaning of the shift amount of the fractional deviation Dlevel is now explained.

In a case where the control mode selected by the driver of the present vehicle is the Short Time Period Control Mode, it is desirable to determine the deceleration gradient dG such that it can be sensitive to the change of the original fractional deviation of the inter-vehicle time period Tdep. To determine the deceleration gradient dG in this way, the inter-vehicle distance D becomes more likely to be controlled without occurrence of undershoot. In this context, the undershoot is a phenomenon where the actual inter-vehicle distance becomes shorter than the target inter-vehicle distance, the present vehicle getting closer to the preceding vehicle, since an actual value of a controlled amount of the deceleration exceeds a desired value of it.

Figure 6:
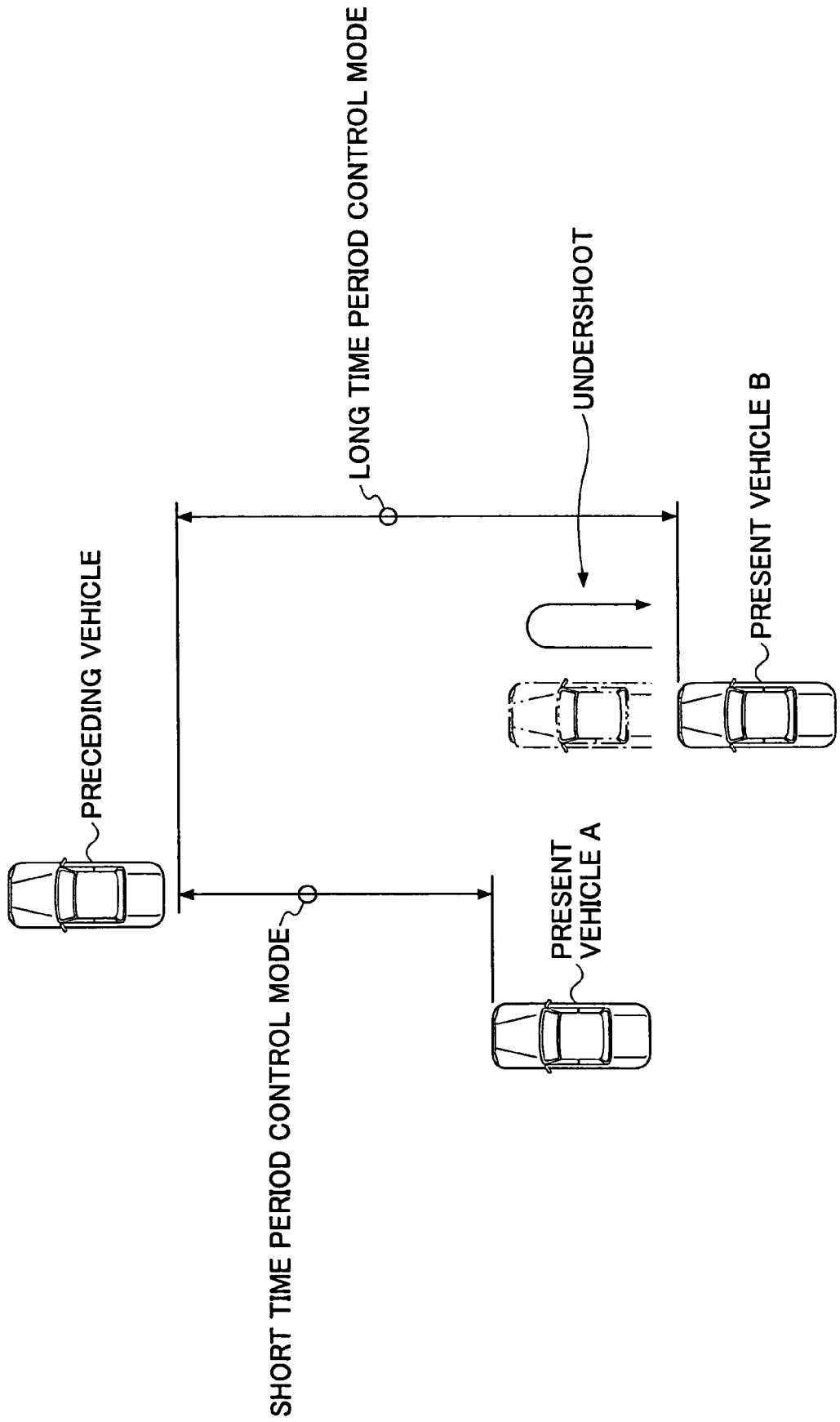
FIG. 6 is a view showing that characteristics in the deceleration control run by the deceleration control program in FIG. 3 are different between a Short Time Period Control Mode and a Long Time Period Control Mode.

An illustrative situation where the present vehicle A decelerates under the Short Time Period Control Mode is conceptually shown on the left side of FIG. 6. In this situation, the inter-vehicle distance between the present vehicle A and the preceding vehicle is controlled without occurrence of the undershoot.

In contrast to this, in a case where the control mode selected by the driver of the present vehicle is the Long Time Period Control Mode, it is desirable to determine the deceleration gradient dG such that it can be insensitive to the change of the original fractional deviation of the inter-vehicle time period Tdep. To determine the deceleration gradient dG in this way, the inter-vehicle distance D becomes more likely to be controlled with the occurrence of undershoot.

An illustrative situation where the present vehicle B decelerates under the Long Time Period Control Mode is conceptually shown on the right side of FIG. 6. In this situation, the inter-vehicle distance between the present vehicle B and the preceding vehicle is controlled with occurrence of the undershoot.

As explained above, it is desirable to change the characteristics of the inter-vehicle control based on the type of the control mode. To realize this, the shift amount of the fractional deviation Dlevel is used in this embodiment.

Figure 7:
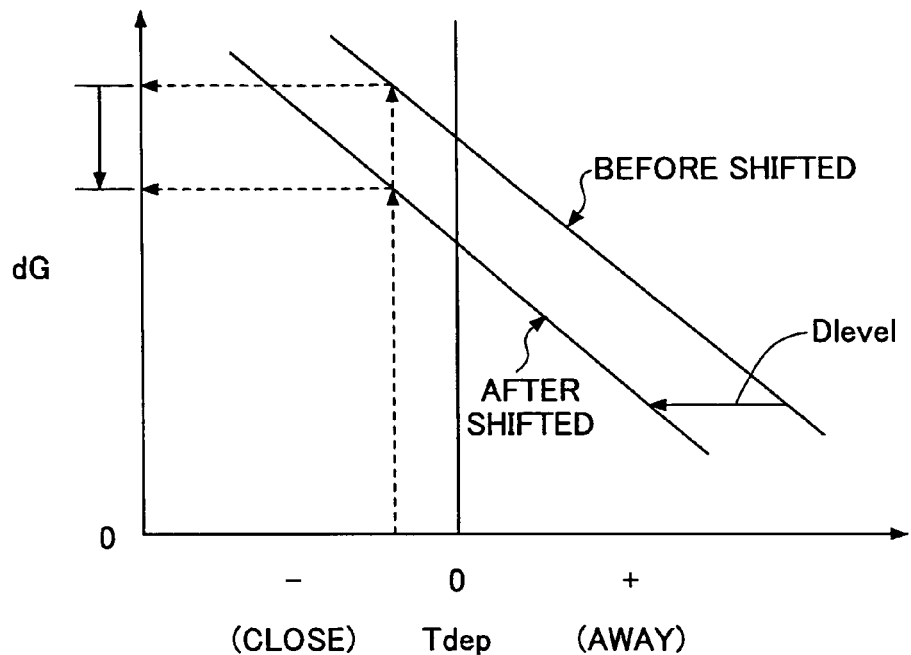
FIG. 7 is a graph showing processes at S304-S306 in FIG. 3.

FIG. 7 shows two parallel downward-sloping graphic lines. With the same value of the original fractional deviation of the inter-vehicle time period Tdep, the upper line takes a larger deceleration gradient dG than one that the lower line takes.

Accordingly, by using the upper line when the Short Time Period Control Mode is selected and using the lower line when the Long Time Period Control Mode is selected for the same value of the original fractional deviation of the inter-vehicle time period Tdep, it can be made possible to flexibly adapt the characteristics of the inter-vehicle distance control to the type of the control mode.

Consequently, in this embodiment, by way of example, the relationship (c.f. FIG. 4) between the final fractional deviation of the inter-vehicle time period GTdep and the deceleration gradient dG is defined on the basis of the upper line, and the final fractional deviation GTdep is obtained by adding the shift amount of the fractional deviation Dlevel to the original fractional deviation of the inter-vehicle time period Tdep, realizing the lower line virtually.

Returning to the description of the flowchart in FIG. 3, to achieve the above-mentioned processes, the control mode selected by the driver via the mode selection switch 113 is first read (S303).

Figure 8:
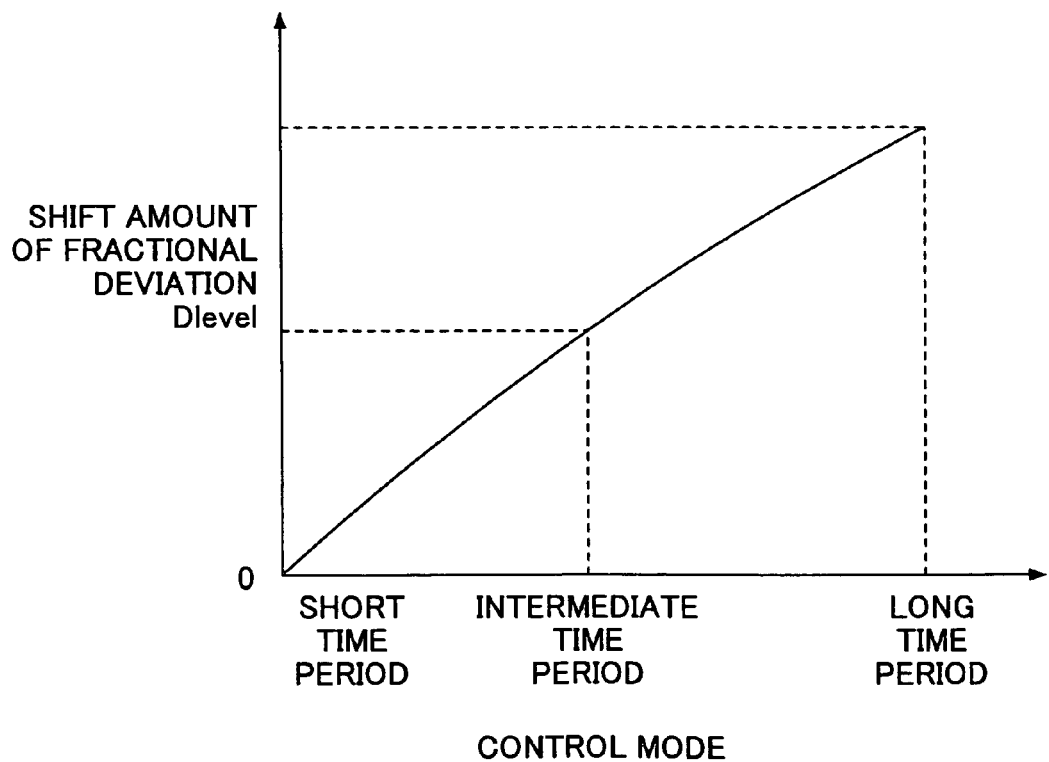
FIG. 8 is a graph showing a relationship between the control mode and a shift amount of a fractional deviation Dlevel used in a process at S304 in FIG. 3.

Once the control mode is read, the shift amount of the fractional deviation Dlevel is determined depending on the selected control mode in accordance with a relationship pre-stored in the above-mentioned ROM (S304), the relationship being conceptually shown in FIG. 8. As shown in FIG. 8, in this embodiment, the shift amount of the fractional deviation Dlevel is, by way of example, determined to be 0 when the Short Time Period Control Mode is selected, to be an intermediate value when the Intermediate Time Period Control Mode is selected, and to be a maximum value when the Long Time Period Control Mode is selected.

Once the shift amount of the fractional deviation Dlevel is determined, a current original fractional deviation of the inter-vehicle time period Tdep is then derived from a relationship between the actual inter-vehicle time period TR and the target inter-vehicle time period TT (S305), the actual inter-vehicle time period TR being obtained by dividing the actual inter-vehicle distance D detected by the radar 107 by the actual vehicle speed Vn detected by the vehicle speed sensor 109 (i.e., TR=D/Vn).

Once the original fractional deviation of the inter-vehicle time period Tdep is calculated, the relative vehicle speed Vr is then calculated by subtracting a previous value of the actual inter-vehicle distance D from a current value of the actual inter-vehicle distance D, and then dividing the result by the length of cycle of the control (S307). In a case where the length of cycle of the control is constant during a plurality of cycles, the above result of the subtraction can be used as the relative vehicle speed Vr for the sake of convenience of the calculation.

Once the relative vehicle speed Vr is calculated, a current deceleration gradient dG corresponding to the final fractional deviation of the inter-vehicle time period GTdep calculated at S306 as well as to the relative vehicle speed Vr calculated at S307 is then read from a map or the like as already explained.

In this embodiment, the target deceleration GT0 and the deceleration gradient dG are determined in this way in order to achieve the limitation for the deceleration gradient. However, the above-mentioned control is mainly aimed at the control during the deceleration in catching-up, and it is preferable to perform some additional adjustment during the deceleration in following or the deceleration in interruption.

In this context, the "deceleration in catching-up" indicates a deceleration of the present vehicle arising after the preceding vehicle is detected in a non-following condition until the target inter-vehicle distance is achieved in a following condition under the inter-vehicle distance control. Also, in this context, the "deceleration in following" indicates a deceleration of the present vehicle following the preceding vehicle under the inter-vehicle distance control in order to decelerate the present vehicle in conformity with the deceleration of the preceding vehicle, which is typically a deceleration of the present vehicle under a situation where the inter-vehicle distance between the present vehicle and the preceding vehicle is relatively short. Further, in this context, the "deceleration in interruption" indicates a deceleration of the present vehicle which becomes necessary when the third vehicle cuts in between the present vehicle and the preceding vehicle from a neighboring traffic lane or when the present vehicle and cuts in between two vehicles traveling in a neighboring traffic lane from a current traffic lane, which is typically a deceleration of the present vehicle under a situation where the inter-vehicle distance between the present vehicle and the preceding vehicle is relatively short.

Thus, it can be said that the inter-vehicle distance between the present vehicle and the preceding vehicle is relatively insufficient in the deceleration in following or in the deceleration in interruption described above, compared to the inter-vehicle distance in the deceleration in catching-up. In such a situation where the inter-vehicle distance between the present vehicle and the preceding vehicle is relatively insufficient, it can be expected that some passengers in the present vehicle may have a sense of discomfort that the deceleration may be unnecessarily too gradual in light of the inter-vehicle distance between the present vehicle and the preceding vehicle if a relatively gradual deceleration takes place under the above-mentioned limitation of the deceleration gradient.

Consequently, in this embodiment, the above-mentioned limitation of the deceleration gradient is used as a base process in view of the deceleration in catching-up, and the deceleration is enhanced in the deceleration in following or in the deceleration in interruption, in order to improve the passengers' feeling of safety.

After the deceleration gradient dG is determined at S308 in FIG. 3 from the final fractional deviation of the inter-vehicle time period GTdep and the relative vehicle speed Vr, the processes at S309-S312 correspond to the deceleration in following, and the processes at S313-S315 correspond to the deceleration in interruption. These processes are now explained.

Once the deceleration gradient dG is determined, it is then determined whether the present vehicle is under the deceleration in following (S309). In this embodiment, by way of example, it is determined that the present vehicle is under the deceleration in following when either of the following two conditions is satisfied:

Condition 1

(a) The control mode selected by the driver of the present vehicle is the "Short Time Period Control Mode": AND, (b) The fractional deviation of the inter-vehicle time period Tdep is less than a predetermined percentage (%); AND, (c) The relative vehicle speed is less than a predetermined threshold; AND, (d) The relative acceleration is less than a predetermined threshold, Condition 2

(a) The actual inter-vehicle distance D is less than a predetermined threshold; AND, (b) A preceding vehicle exists; AND, (c) A requested value of target acceleration is negative; AND, (d) The relative vehicle speed is less than a predetermined threshold; AND, (e) The relative acceleration is less than a predetermined threshold.

In an alternative embodiment in which the control modes are not three types: Short, Intermediate, and Long as in this embodiment, one or more control mode(s) resulting in the shortest inter-vehicle distance(s) among all of provided control modes may be used in the sub-point (a) in the above Condition 1. Regarding the sub-point (b) in the Condition 1, it can be said in brief that this is satisfied when the actual inter-vehicle distance D is less than a target value. Regarding the sub-point (c) in the Condition 1, it can be said in brief that this is satisfied when the preceding vehicle slows down. Regarding the sub-point (d) in the Condition 1, it can be said in brief that this is satisfied when the deceleration of the preceding vehicle increases.

In the sub-point (a) in the above Condition 2, the predetermined threshold is a constant or fixed value regardless of the selected control mode. Regarding the sub-point (c), it can be said in brief that this is satisfied when the present vehicle is requesting to decelerate. Regarding the sub-point (d), it can be said in brief that this is satisfied when the vehicle speed of the preceding vehicle decreases. Regarding the sub-point (e) in the Condition 2, it can be said in brief that this is satisfied when the deceleration of the preceding vehicle increases.

As can be seen in the above example of the conditions for determination, all decelerations of the present vehicle under the inter-vehicle control in order to follow the preceding vehicle are not referred to as the deceleration in following, but particular decelerations among them, which are under the circumstance where the inter-vehicle distance is relatively short, are referred to as the deceleration in following in this embodiment.

Figure 9:
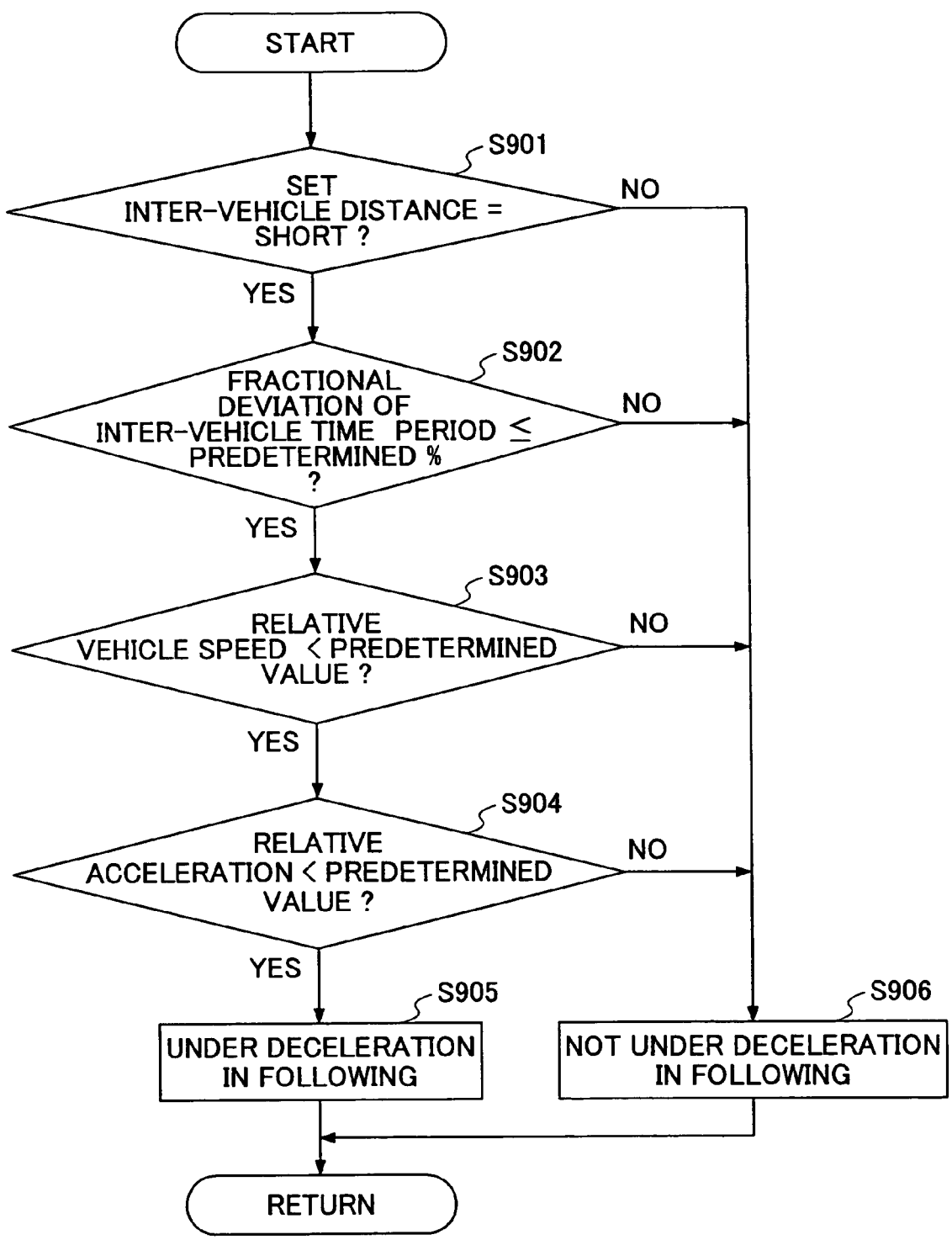
FIG. 9 is a flowchart showing a process run by the deceleration control program in FIG. 3 to determine whether the present vehicle is in the deceleration in following.

An example of a flowchart in a case where the above Condition 1 is checked is shown in FIG. 9. Decision processes at S901-S904 correspond to the sub-points (a)-(d), respectively. When all the sub-points (a)-(d) are satisfied so that "YES" is selected at each of S901-S904, it is determined that the present vehicle is in the deceleration in following (S905). On the other hand, when at least one of the sub-points (a)-(d) is not satisfied so that "NO" is selected at any of S901-S904, it is decided that the present vehicle is not in the deceleration in following (S906).

Returning to FIG. 3, when it is determined that the present vehicle is in the deceleration in following in accordance with such a process ("YES" at S309), the target deceleration GT0 calculated at S301 is multiplied by a gain of correction, and the resulting corrected target deceleration GT0' is set as a deceleration for being actually requested (S310).

In this embodiment, the target deceleration is enhanced in this way when the present vehicle is in the deceleration in following. However, even though the target deceleration is enhanced, this may not lead to an improvement of the driver's sense of safety if the deceleration of the present vehicle is gradually increased to the corrected target deceleration due to the above limitation of the deceleration gradient.

Consequently, in this embodiment, how to perform the limitation of the deceleration gradient is corrected as appropriate. At first, it is determined whether the deceleration gradient dG determined at S308 needs to be corrected at S311, in consideration of the new target deceleration GT0' after the correction at S310.

In this embodiment, it is determined at S311 that the deceleration gradient dG needs to be corrected, by way of example, when the difference between the target deceleration and the actual deceleration is greater than a predetermined threshold (in km/h/s units) and the rate of change of such difference is greater than a predetermined threshold (in km/h/s$^2$)

If the deceleration gradient dG needs to be corrected ("YES" at S311), a process of correcting the deceleration gradient dG determined at S308 is performed (S312). The correction of the deceleration gradient dG at S312 is a correction for increasing the deceleration gradient dG (i.e., making the deceleration gradient dG steeper), because an aim of this correction is to prevent the deceleration from increasing too gradually in light of the inter-vehicle distance, as described above. The specific amount of increase for the deceleration gradient dG may be appropriately selected. For example, the deceleration gradient dG may be increased based on the difference between the predetermined threshold used in the determination at S311 and actual measurement, or may be increased by increasing a gradient level by 1 in a case where the deceleration gradient dG read at S308 is pre-classified into one of a predetermined number of gradient levels.

On the other hand, when it is determined that the present vehicle is not in the deceleration in following ("NO" at S309), the process goes to S313 without the process of correction for the target deceleration GT0 or the process of correction for the deceleration gradient dG. In addition, when it is determined that the correction of the deceleration gradient dG is not necessary even though the present vehicle is in the deceleration in following ("NO" at S311), the process goes to S313 with only the process of correction for the target deceleration GT0.

After the processes for the deceleration in following are finished, it is then determined whether the present vehicle is in the deceleration in interruption (S313). In this embodiment, by way of example, it is decided that the present vehicle is under the deceleration in interruption when the following condition is satisfied:

Condition (x) The relative vehicle speed is less than a predetermined threshold; AND, (y) The actual inter-vehicle distance D is less than a predetermined threshold.

In the sub-point (y) in the above Condition, the predetermined threshold is determined based on the relative vehicle speed, which is also used in the sub-point (x) of the Condition.

As can be seen in the above example of the conditions for determination, all decelerations of the present vehicle due to the inter-vehicle control under the circumstance where the third vehicle traveling in a neighboring traffic lane changes lane and cuts in between the present vehicle and the preceding vehicle or where the present vehicle changes lane and cuts in between two vehicles traveling in a neighboring traffic lane are not referred to as the deceleration in interruption, but particular decelerations among them, which are under the circumstance where the inter-vehicle distance is relatively short, are referred to as the deceleration in interruption in this embodiment.

Figure 10:
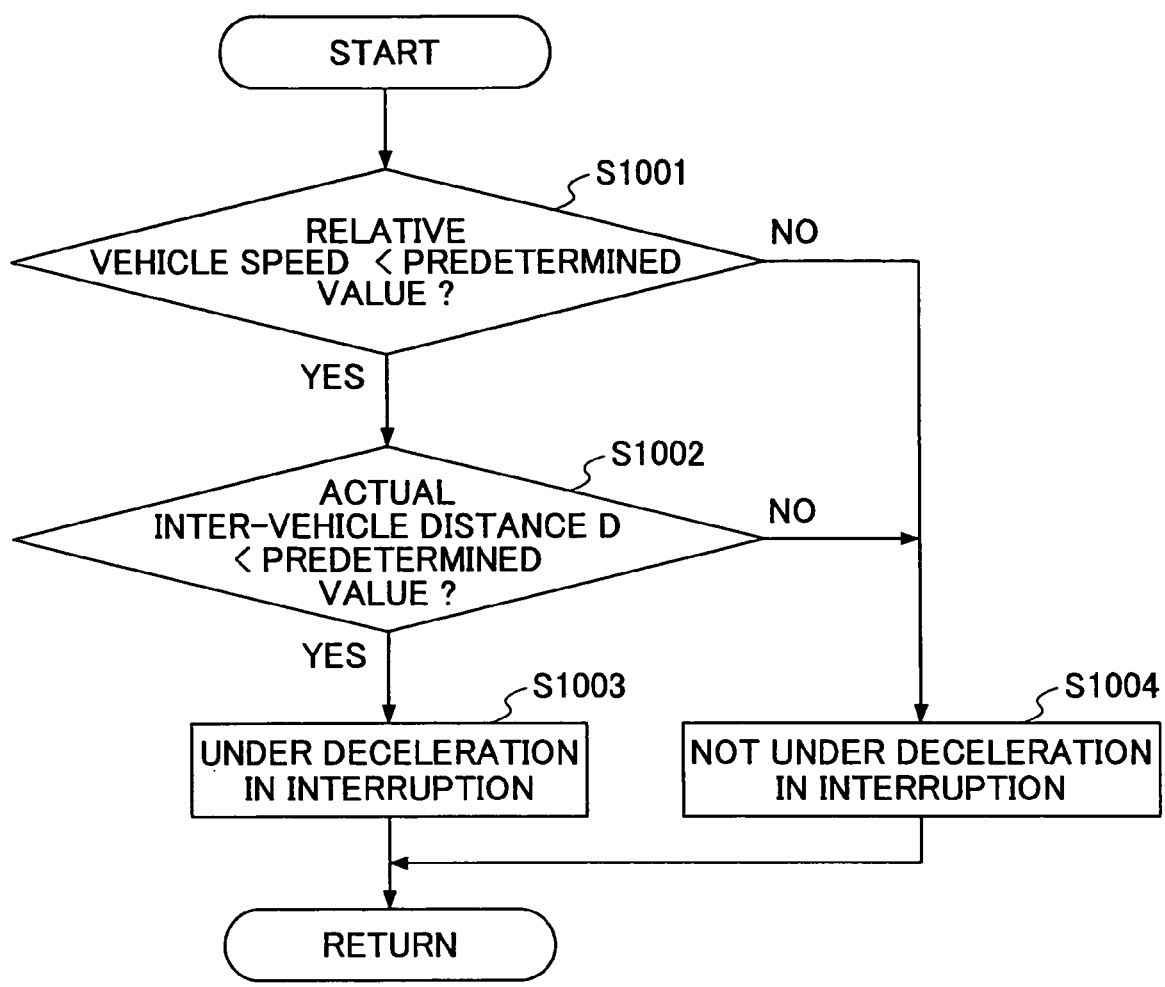
FIG. 10 is a flowchart showing a process run by the deceleration control program in FIG. 3 to determine whether the present vehicle is in the deceleration in interruption; and, FIG. 11 is a graph showing transitions of the target deceleration GT with and without a correction process under a series of deceleration control operations run by the deceleration program in FIG. 3.

An example of a flowchart in a case where the above Condition is checked is shown in FIG. 10. Decision processes at S1001 and S1002 correspond to the sub-points (x) and (y), respectively. When both the sub-points (x) and (y) are satisfied so that "YES" is selected at each of S1001 and S1002, it is determined that the present vehicle is in the deceleration in interruption (S1003). On the other hand, when at least one of the sub-points (x) and (y) is not satisfied so that "NO" is selected at either of S1001 or S1002, it is determined that the present vehicle is not in the deceleration in interruption (S1004).

Returning to FIG. 3, when it is determined that the present vehicle is in the deceleration in interruption in accordance with such a process ("YES." at S313), it is then determined whether a correction or an additional correction is necessary to the deceleration gradient dG determined at S308 or the corrected deceleration gradient dG corrected at S312 (S314).

In this embodiment, it is determined at S314 that the deceleration gradient or corrected deceleration gradient dG needs to be corrected or additionally corrected, by way of example, when the difference between the target deceleration and the actual deceleration is greater than a predetermined threshold (in km/h/s units) and the rate of change of such difference is greater than a predetermined threshold (in km/h/s$^2$) .

If the deceleration gradient or corrected deceleration gradient dG needs to be corrected or additionally corrected ("YES" at S314), another process of correction to the deceleration gradient dG determined at S308 or to the corrected deceleration gradient dG corrected at S312 is performed (S315). This correction of the deceleration gradient or corrected deceleration gradient dG at S315 is a correction for increasing the deceleration gradient dG (i.e., making the deceleration gradient dG steeper), because an aim of this correction is to prevent the deceleration from increasing too gradually in light of the inter-vehicle distance, as described above. The specific amount of increase for the deceleration gradient dG may be appropriately selected. For example, the deceleration gradient or corrected deceleration gradient dG may be increased based on the difference between the predetermined threshold used in the determination at S315 and actual measurement, or may be increased by increasing a gradient level by 1 in a case where the deceleration gradient dG read at S308 is pre-classified into one of a predetermined number of gradient levels.

On the other hand, when it is determined that the present vehicle is not in the deceleration in interruption or when it is determined that the correction or additional correction of the deceleration gradient or corrected deceleration gradient dG is not necessary even though the present vehicle is in the deceleration in interruption ("NO" at S313), the process goes to S316 without the process of correction or additional correction for the deceleration gradient or corrected deceleration gradient dG.

In this way, when the present vehicle is in the deceleration in following and/or in the deceleration in interruption, final values for the target deceleration GT0 and the deceleration gradient dG are determined after appropriately correcting the target deceleration GT0 calculated at S301 and/or the deceleration gradient dG determined at S308. When the present vehicle is in the deceleration in catching-up ("NO" at S309 and "NO" at S313), the target deceleration GT0 and the deceleration gradient dG determined at S301 and S308, respectively, become the final values.

Once the final target deceleration GT0 and the deceleration gradient dG are determined, these are then sent to the brake ECU 105 via the engine ECU 106 (S316). The brake ECU 105 receives those target deceleration GT0 and deceleration gradient dG and uses these GT0 and dG to calculate a deceleration to be realized by the brakes 101 at each control cycle and to control the brakes 101 to realize such deceleration.

Figure 11:
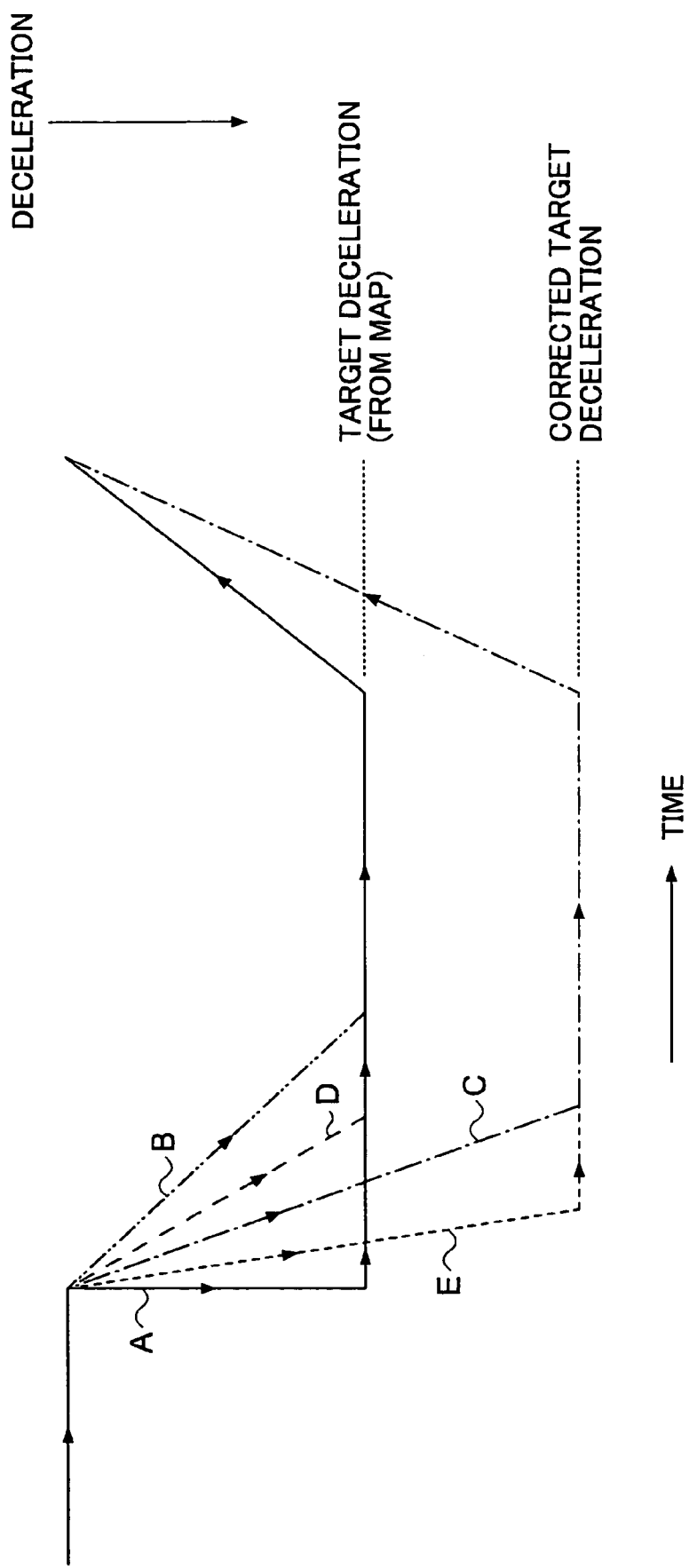

Finally, an example of the deceleration control according to this embodiment is now explained with reference to FIG. 11. In FIG. 11, the horizontal axis and the vertical axis indicate time and deceleration, respectively, in which the deceleration becomes greater as going down on the drawing along the vertical axis.

In FIG. 11, a line A, which is a continuous line, indicates a transition of the deceleration in a case where the limitation of the deceleration gradient according to this embodiment is not performed.

A line B, which is a chain double-dashed line, indicates a transition of the deceleration in a case where the limitation of the deceleration gradient according to this embodiment is performed, for example, when the present vehicle is in the deceleration in catching-up. As shown, the line B more gradually goes to the target deceleration than the line A.

A line C, which is a chain line, indicates a transition of the deceleration in a case where the process of correction according to this embodiment is performed when the present vehicle is in the deceleration in following. As shown, the line C has an increased target deceleration and more steeply goes to the increased target deceleration than the line B accompanied by only the limitation of the deceleration gradient.

A line D, which is a coarse dashed line, indicates a transition of the deceleration in a case where the process of correction according to this embodiment is performed when the present vehicle is in the deceleration in interruption. As shown, the line D has the same target deceleration as the line B and more steeply goes to the target deceleration than the line B accompanied by only the limitation of the deceleration gradient.

A line E, which is a close dashed line, indicates a transition of the deceleration in a case where the process of correction according to this embodiment is performed when the present vehicle transitions from being in the deceleration in following to being in the deceleration in interruption. As shown, the line E has the same target deceleration as the line C and much more steeply goes to the target deceleration than the line C accompanied by only the correction for the deceleration in following.

Thus, according to this embodiment, since an allowable amount of the undershoot is varied in accordance with the control mode, i.e., in accordance with the length of the inter-vehicle distance (or the inter-vehicle time period) set under the inter-vehicle distance control so that the allowable amount of the undershoot is increased as the set inter-vehicle distance becomes longer, the passengers in the present vehicle equipped with the inter-vehicle distance control apparatus according to this embodiment may not have a sense of discomfort that the amount of the undershoot may be unnecessarily too large and too small when the set inter-vehicle distance is relatively short and long, respectively.

In addition, according to this embodiment, since the deceleration of the present vehicle is gradually increased to the target deceleration when the inter-vehicle distance between the present vehicle and the preceding vehicle is relatively sufficient by limiting the deceleration gradient, the passengers in the present vehicle equipped with the inter-vehicle distance control apparatus according to this embodiment may not have a sense of discomfort that the deceleration may be too rapid, particularly when the inter-vehicle distance is relatively sufficient.

Furthermore, according to this embodiment, since the deceleration of the present vehicle is corrected when the inter-vehicle distance between the present vehicle and the preceding vehicle is relatively insufficient, for example, under the deceleration in following or the deceleration in interruption, to increase the deceleration of the present vehicle greater than the deceleration under the circumstance where the inter-vehicle distance is relatively sufficient, for example, under the deceleration in catching-up, the passengers in the present vehicle equipped with the inter-vehicle control apparatus according to this apparatus may not have a sense of discomfort that the deceleration may be unnecessarily too gradual, particularly when the inter-vehicle distance is relatively insufficient.

By the way, in the above embodiment, by way of example, an illustrative case is described where the control of deceleration under the deceleration in catching-up is a base process and the deceleration is corrected to increase under the deceleration in following and the deceleration in interruption. However, it can be understood by a person skilled in the art that the present invention is not limited to this and an opposite case where the control of deceleration under the deceleration in following and/or the deceleration in interruption is a base process and the deceleration is corrected to decrease under the deceleration in catching-up is also within the scope of the present invention.

The present invention is applicable to any inter-vehicle distance control apparatus including a so-called Adaptive Cruise Control (ACC) apparatus. The present invention does not depend on visual design, weight, size, or performance of driving of the vehicle on which the inter-vehicle distance control apparatus of the present invention is employed.

The contents of Japanese Patent Application No. JP2004-224732 filed on Jul. 30, 2004 including the specification, drawings, and abstract are incorporated herein by reference in its entirety.

What is claimed is:

1. An inter-vehicle distance control apparatus, comprising:
a unit for controlling an inter-vehicle distance between a present vehicle equipped with this apparatus and a preceding vehicle traveling ahead of the present vehicle by controlling operations of the present vehicle, the unit being configured to change a deceleration gradient with which the deceleration of the present vehicle reaches a target deceleration between when the present vehicle is under a first deceleration condition in which the present vehicle decelerates under the circumstance where the inter-vehicle distance between the present vehicle and the preceding vehicle is relatively short and when the present vehicle is under a second deceleration condition in which the present vehicle decelerates under a circumstance where the inter-vehicle distance between the present vehicle and the preceding vehicle is relatively long, the deceleration gradient is determined based on a final fractional deviation of an inter-vehicle time period and a relative speed between the present vehicle and the preceding vehicle, wherein the final fractional deviation of the inter-vehicle time period is obtained by adding a shift amount of a fractional deviation to an original fractional deviation of the inter-vehicle time period, wherein the original fractional deviation of the inter-vehicle time period is obtained by subtracting a target inter-vehicle time period selected by the driver of the present vehicle from an actual inter-vehicle time period obtained by dividing an actual inter-vehicle distance between the present vehicle and the preceding vehicle by an actual vehicle speed of the present vehicle and then dividing the result of the subtraction by the target inter-vehicle time period, and wherein the shift amount of a fractional deviation is determined depending on the target inter-vehicle time period.

2. The inter-vehicle distance control apparatus as claimed in claim 1, wherein:

the unit is configured to increase the deceleration gradient when the present vehicle is under the first deceleration condition, compared to when the present vehicle is under the second deceleration condition.

3. The inter-vehicle distance control apparatus as claimed in claim 1, wherein:

the first deceleration condition arises when the present vehicle is under a deceleration in following or under a deceleration in interruption, and the second deceleration condition arises when the present vehicle is under a deceleration in catching-up.

4. An inter-vehicle distance control apparatus, comprising:

a unit for controlling an inter-vehicle distance between a present vehicle equipped with this apparatus and a preceding vehicle traveling ahead of the present vehicle by controlling operations of the present vehicle, the unit being configured to change a target deceleration of the present vehicle and a deceleration gradient with which the deceleration of the present vehicle reaches the target deceleration between when the present vehicle is under a first deceleration condition in which the present vehicle decelerates under a circumstance where the inter-vehicle distance between the present vehicle and the preceding vehicle is relatively short and when the present vehicle is under a second deceleration condition in which the present vehicle decelerates under a circumstance where the inter-vehicle distance between the present vehicle and the preceding vehicle is relatively long, the deceleration gradient is determined based on a final fractional deviation of an inter-vehicle time period and a relative speed between the present vehicle and the preceding vehicle, wherein the final fractional deviation of the inter-vehicle time period is obtained by adding a shift amount of a fractional deviation to an original fractional deviation of the inter-vehicle time period, wherein the original fractional deviation of the inter-vehicle time period is obtained by subtracting a target inter-vehicle time period selected by the driver of the present vehicle from an actual inter-vehicle time period obtained by dividing an actual inter-vehicle distance between the present vehicle and the preceding vehicle by an actual vehicle speed of the present vehicle and then dividing the result of the subtraction by the target inter-vehicle time period, and wherein the shift amount of a fractional deviation is determined depending on the target inter-vehicle time period.

5. The inter-vehicle distance control apparatus as claimed in claim 4, wherein:

the unit is configured to increase both the target deceleration and the deceleration gradient when the present vehicle is under the first deceleration condition, compared to when the present vehicle is under the second deceleration condition.

6. The inter-vehicle distance control apparatus as claimed in claim 4, wherein:

the first deceleration condition arises when the present vehicle is under a deceleration in following or under a deceleration in interruption, and the second deceleration condition arises when the present vehicle is under a deceleration in catching-up.

7. An inter-vehicle distance control apparatus, comprising:

a unit for controlling an inter-vehicle distance between a present vehicle equipped with this apparatus and a preceding vehicle traveling ahead of the present vehicle by controlling operations of the present vehicle, the unit being configured to change a target deceleration of the present vehicle and a deceleration gradient with which the deceleration of the present vehicle reaches the target deceleration among when the present vehicle is under a first deceleration condition in which the present vehicle decelerates based on operations of the preceding vehicle under a circumstance where the inter-vehicle distance between the present vehicle and the preceding vehicle is relatively short, when the present vehicle is under a second deceleration condition in which the present vehicle decelerates based on operations of a third vehicle under a circumstance where the inter-vehicle distance between the present vehicle and the preceding vehicle is relatively short, and when the present vehicle is under a third deceleration condition in which the present vehicle decelerates under a circumstance where the inter-vehicle distance between the present vehicle and the preceding vehicle is relatively long, the deceleration gradient is determined based on a final fractional deviation of an inter-vehicle time period and a relative speed between the present vehicle and the preceding vehicle, wherein the final fractional deviation of the inter-vehicle time period is obtained by adding a shift amount of a fractional deviation to an original fractional deviation of the inter-vehicle time period, wherein the original fractional deviation of the inter-vehicle time period is obtained by subtracting a target inter-vehicle time period selected by the driver of the present vehicle from an actual inter-vehicle time period obtained by dividing an actual inter-vehicle distance between the present vehicle and the preceding vehicle by an actual vehicle speed of the present vehicle and then dividing the result of the subtraction by the target inter-vehicle time period, and wherein the shift amount of a fractional deviation is determined depending on the target inter-vehicle time period.

8. The inter-vehicle distance control apparatus as claimed in claim 7, wherein:

the unit is configured to increase the target deceleration when the present vehicle is under the first deceleration condition, compared to when the present vehicle is under the second deceleration condition or under the third condition, and to increase the deceleration gradient when the present vehicle is under the first deceleration condition or under the second deceleration condition, compared to when the present vehicle is under the third deceleration condition.

9. The inter-vehicle distance control apparatus as claimed in claim 7, wherein:

the first deceleration condition arises when the present vehicle is under a deceleration in following, the second deceleration condition arises when the present vehicle is under a deceleration in interruption, and the third deceleration condition arises when the present vehicle is under a deceleration in catching-up.

* * * * *